United States Patent [19]

Kita et al.

[11] 4,353,958

[45] Oct. 12, 1982

[54] GREEN CERAMIC TAPES AND METHOD OF PRODUCING THEM

[75] Inventors: Katsuhiko Kita; Junzo Fukuda, both of Nagoya; Hidemasa Ohmura; Takeya Sakai, both of Wakayama, all of Japan

[73] Assignees: Narumi China Corporation, Nagoya; Kao Soap Co., Ltd., Toyko, both of Japan

[21] Appl. No.: 122,852

[22] Filed: Mar. 20, 1980

[30] Foreign Application Priority Data

Feb. 22, 1979 [JP] Japan .................................. 54-20300

[51] Int. Cl.³ .................... B32B 5/16; C04B 35/10; C08K 3/00
[52] U.S. Cl. .................................. 428/329; 264/63; 264/212; 428/403; 428/404; 428/423.1; 428/702; 524/386; 524/389; 524/430
[58] Field of Search .................... 428/404, 403, 423.71, 428/702, 329, 423.7; 260/42.11, 37 N; 264/63, 212

[56] References Cited

U.S. PATENT DOCUMENTS

| 3,631,131 | 12/1971 | Kopko | 260/42.11 |
| 3,953,562 | 4/1976 | Hait et al. | 260/42.11 X |
| 3,991,029 | 11/1976 | Adelman | 260/42.11 X |
| 4,010,133 | 3/1977 | Nakayama | 260/42.11 X |

OTHER PUBLICATIONS

Kirk–Othmer, "Encyclopedia of Chemical Technology", 3rd ed., vol. 5, pp. 234–237, 250–253, John Wiley & Sons.

Primary Examiner—Thomas J. Herbert, Jr.
Attorney, Agent, or Firm—Oblon, Fisher, Spivak, McClelland & Maier

[57] ABSTRACT

Green ceramic tapes are prepared which comprise a finely divided ceramic powder and a water-compatible polyurethane resin binder. The green tapes are prepared by casting a water-based slip containing the ceramic powder and the water-compatible polyurethane resin binder in the form of the tape and then drying the formed tape. The drying is preferably conducted in two stages, in the first of which a relatively humid atmosphere is maintained.

22 Claims, 3 Drawing Figures

GREEN CERAMIC TAPES AND METHOD OF PRODUCING THEM

BACKGROUND OF THE INVENTION

1. Field of the Invention

This invention relates to methods of producing green ceramic tapes and more particularly, to producing such tapes without the use of organic solvents.

2. Description of the Prior Art

Green ceramic tapes have hitherto been prepared using a binder prepared by dissolving a resinous binder such as a butyral resin or the like in an organic solvent such as methyl ethyl ketone, adding the binder solution to a fine ceramic powder and mixing for an extended period of time to prepare a slip, deaerating the slip, and coating the slip onto a substrate using a doctor knife to prepare a tape, and then drying the tape by application of heat.

However, the use of an organic solvent in the conventional process has certain drawbacks such as toxicity and offensive odor perceptible by people in the vicinity of the factory, as well as the danger of explosion which is present with volatile solvents. Accordingly, a method of preparing green ceramic tapes has recently been proposed which employs an aqueous organic binder such as polyvinyl alcohol or polyvinyl acetate, or the like, instead of the organic solvent-based binder.

Although the use of an aqueous-based binder is desirable from the point of view of eliminating the drawbacks of organic solvent-based binders, some problems are still encountered. Among these problems are coagulation of the fine ceramic powder in the slip, deviation of the viscosity of the slip from Newtonian flow, poor fluidity of the slip and poor dispersibility of the ceramic material, and difficulty in forming green tapes having high density and smooth surfaces.

Hence, a need continues to exist for a method of forming green ceramic tapes of high quality without the use of an organic solvent-based binder.

SUMMARY OF THE INVENTION

Therefore it is an object of this invention to prepare high quality green ceramic tapes.

A further object of the invention is to prepare high quality green ceramic tapes using an aqueous-based binder.

Further objects of the invention will become clear from the description of the invention which follows.

According to this invention, green ceramic tapes are prepared using as a binder a water-compatible polyurethane resin. The green tapes of this invention are prepared by adding the water-compatible polyurethane, usually in the form of an aqueous solution or dispersion, to the fine ceramic powder, adding more water to the mixture if necessary, and milling the mixture to obtain an aqueous slip. The slip so prepared may be cast on a surface using a doctor blade and is subsequently dried. The use of a water-compatible polyurethane resin as the binder in the slip for casting the green ceramic tapes provides excellent properties as regards dispersibility of the ceramic powder, fluidity of the aqueous slip, and adhesion to the ceramic powder, and imparts to the green tape flexibility, strength, and smoothness.

According to a further embodiment of the process of this invention, the green tapes are dried under humid conditions to provide a tape of especially good quality.

BRIEF DESCRIPTION OF THE DRAWINGS

A more complete appreciation of the invention and many of the attendant advantages thereof will be readily attained as the same becomes better understood by reference to the following detailed description when considered in connection with the accompanying drawings, wherein.

DETAILED DESCRIPTION OF THE PREFERRED EMBODIMENTS

Figure 1:
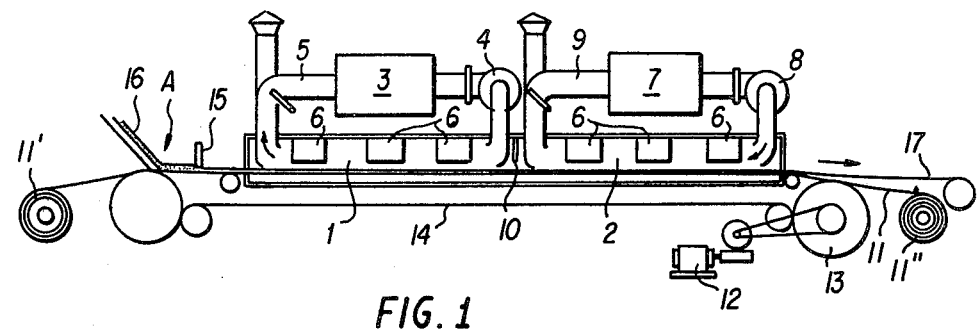
FIG. 1 is a diagram of an apparatus for drying green ceramic tapes which is suitable for carrying out the process of this invention.

The water compatible polyurethane resins which can be used in the present invention are those polyurethanes which can form stable dispersions or solutions in water. These include polyurethane emulsions, solutions of water-soluble polyurethanes, aqueous dispersions of polyurethanes, polyurethane microemulsions and the like. Polyurethane ureas are also suitable for use in this invention. Representative water-compatible polyurethanes, which can be used in this invention and methods for making these polyurethanes, are as follows:

(1) A water-compatible polyurethane resin may be prepared by reacting, in an inert organic solvent:
  (a) a polyhydroxy compound such as a polyester, polyacetal, polyesteramide or polythioether obtained by the condensation of a polyhydric alcohol such as a polyether, ethylene glycol, propylene glycol, butanediol, or hexanediol, or a copolymerization product of tetrahydrofuran, propylene oxide or ethylene oxide, with a polyfunctional carboxylic acid such as maleic acid, succinic acid, adipic acid, phthalic acid, or the like;
  (b) a polyisocyanate, for example, an aromatic isocyanate such as 1,5-naphthalenediisocyanate, 4,4'-diphenylmethane diisocyanate, phenylene diisocyanate, or tolylene diisocyanate, or an aliphatic diisocyanate such as hexamethylene diisocyanate, dicyclohexylmethane diisocyanate, or xylylene diisocyanate; and
  (c) and a chain extender such as a polyhydric alcohol or a low molecular weight polyamine such as ethylenediamine, propylenediamine, or diethylenetriamine.

Suitable organic solvents include tetrahydrofuran, acetone, methyl ethyl ketone, ethyl acetate, and toluene. The urethane polymer solution so obtained is mixed with water containing a suitable amount of an emulsifier and the inert organic solvent is removed by distillation.

(2) A water-compatible polyurethane resin may be produced by chain extending a urethane prepolymer containing free isocyanate groups which is prepared from a polyhydroxyl compound and an excess of a polyisocyanate in water which contains compounds containing active hydrogen atoms such as low molecular weight polyamines or polyhydric alcohols and an emulsifier, followed by emulsification.

(3) A water-compatible polyurethane resin may be produced by emulsifying and chain extending a urethane prepolymer containing free isocyanate groups with water using tertiary amines as a catalyst.

(4) A water-compatible polyurethane resin may be produced by dispersing a urethane prepolymer having terminal isocyanate groups and containing a salt-forming compound such as N,N-dimethylethanolamine in water which contains a neutralizing agent and an emulsifier, and then chain extending the urethane prepolymer with a low molecular weight polyamine.

(5) A water-compatible polyurethane resin may be produced by emulsifying a compound having terminal amine groups in water in the presence of an emulsifier and then adding a polyisocyanate to the emulsion. The compound having terminal amine groups may be prepared by reacting a prepolymer having terminal hydroxyl groups, which is formed by reacting a polyhydroxy compound with a polyisocyanate, with a diamine or by reacting a urethane prepolymer having terminal isocyanate groups with a diamine.

(6) A water-compatible polyurethane may be produced by reacting a urethane prepolymer having terminal isocyanate groups with a compound having tertiary amino groups such as an N-alkyldiethanolamine or triethanolamine, neutralizing the reaction product with acid, and then emulsifying the reaction product in water.

(7) A water-compatible polyurethane may be produced by reacting a urethane prepolymer having terminal isocyanate groups with a compound having a tertiary amino group such as an N-alkyldiethanolamine, quaternizing the tertiary amino group with an alkylating agent, and admixing the reaction product with water.

(8) A water-compatible polyurethane may be produced by reacting a urethane polymer containing halogen groups or sulfonic acid groups with a tertiary amine, and admixing the reaction product with water.

(9) A water-compatible polyurethane may be produced by reacting hydroxyl groups or amino groups of a polyurethane containing primary and/or secondary hydroxyl groups and/or amino groups with a cyclic compound which forms a salt after the ring has been opened, such as cyclic dicarboxylic acid anhydrides, sultones or lactones, neutralizing the reaction product with a base, and mixing the product with water.

(10) A water-compatible polyurethane may be produced by chain-extending a urethane prepolymer having terminal isocyanate groups obtained from a water-soluble polyhydroxyl compound and a polyisocyanate in an aqueous solution of a polyfunctional amine.

(11) A water-compatible polyurethane may be produced by reacting a urethane prepolymer having terminal isocyanate groups with an aqueous solution of a compound having amino groups or hydroxyl groups and sulfonic groups or carboxyl groups, such as an alkali or ammonium salt of a diaminocarboxylic acid, to extend the chain while effecting the emulsification.

(12) A water-compatible polyurethane may be produced by reacting a polyhydroxyl compound, a compound having quaternary ammonium groups and hydroxyl groups in the molecule, a compound having epoxy groups and hydroxyl groups in the molecule and a polyisocyanate, and mixing the reaction product with water.

(13) A water-compatible polyurethane may be produced by reacting a urethane prepolymer having terminal isocyanate groups with a hydroxyl compound containing a quaternary ammonium salt group, and mixing the reaction product with water.

(14) A water-compatible polyurethane may be produced by reacting a polyisocyanate with a water-soluble glycol which is a polyoxyethylene glycol or a ring-opened copolymer of ethylene oxide and propylene oxide.

(15) A water-compatible polyurethane may be produced by mixing a urethane prepolymer containing carboxyl groups and isocyanate groups, prepared from a polyhydroxyl compound having carboxyl groups and a polyisocyanate, into a basic aqueous solution, whereby neutralization as well as chain extension with water or low molecular weight polyamines is effected.

(16) A water-compatible polyurethane may be produced by reacting a urethane prepolymer having terminal isocyanate groups with a polyalkylene polyamine such as diethylene triamine to prepare a polyurethane urea polyamine, followed by the addition of an aqueous solution of acid or followed by the addition of an epihalohydrin to the polyurethane urea polyamine and subsequent addition of an aqueous solution of acid.

(17) A water-compatible polyurethane may be produced by reacting a polyurethane urea polyamine, or an alkyl ($C_{12}$–$C_{22}$) isocyanate addition product thereof, or an epihalohydrin addition product thereof, with a cyclic dicarboxylic acid anhydride, and mixing an aqueous solution of a basic substance therewith.

(18) A water-compatible polyurethane may be produced by reacting a polyurethane urea polyamine, or the epihalohydrin addition product thereof, with sultones or lactones, or with a sodium monohalocarboxylate, or with a (meth)acrylic acid ester or acrylonitrile, followed by hydrolysis, and then mixing the reaction product with water.

(19) A water-compatible polyurethane may be produced by reacting a urethane prepolymer having terminal isocyanate groups, obtained from a polyhydroxy compound, including polyoxyethylene glycol, and a polyisocyanate, with a polyalkylene polyamine such as diethylene triamine to prepare a polyurethane urea polyamine, followed by mixing with water, or followed by adding an epihalohydrin to the polyurethane urea polyamine and subsequently mixing with water.

In addition to the water-compatible polyurethanes produced by the above-mentioned representative methods, polyurethanes having elasticity and flexibility and which stably exist in an aqueous system can be effectively used for the present invention. However, those water-compatible polyurethanes which exhibit sufficient mechanical stability when they are mixed with a finely divided ceramic powder to prepare an aqueous slip and which are useful in preparing aqueous slips that exhibit excellent fluidity, are particularly suited for the method of the present invention. The water-compatible polyurethanes obtained by the above-mentioned methods (16) to (19) are particularly effective for the present invention.

According to the present invention, the water-compatible polyurethane-type binder is used in an amount of 2 to 15 parts by weight reckoned as a resin component with respect to 100 parts of the fine ceramic powder. When the amount of the water-compatible polyurethane resin binder is less than 2 parts by weight, the resulting green tape tends to develop cracks. When the amount of the water-compatible polyurethane resin binder is greater than 15 parts, on the other hand, the resulting green tape contains many voids. It is particularly preferable, therefore, that the water-compatible polyurethane resin binder be used in an amount of about 7 parts.

A dispersing agent may be included in small amounts, as required, in order to help disperse the ceramic powder. However, in order to avoid gelling the binder, the dispersing agent should be non-ionic or should have an ionic charge the same as that of the water-compatible polyurethane used as the binder. Examples of dispersing agents suitable for this purpose are polyoxyethylene alkylphenol ethers, polyoxyethylene alkyl ethers, and the like. The most preferred dispersing agent is a polyoxyethylene nonylphenol ether (HLB value 17.5). Good results are obtained when the dispersing agent is used in an amount of 1 part to 100 parts of the ceramic powder. Water to be blended should be de-ionized so that the dispersibility of the ceramic powder is not reduced. The water may further be admixed with a water-soluble organic solvent such as ethyl alcohol, ethylene glycol or the like.

The green tape prepared from the aqueous slip which is obtained by mixing together a finely divided ceramic powder, a suitable amount of the water-compatible polyurethane-type binder, a dispersing agent and a suitable amount of water, followed by sufficient milling, can be dried by a conventional drying method, i.e. by a method which heats the tape from the lower portion of the carrier film, or by a method which dries the tape by hot air. With such methods, however, the surface of the tape is dried first, and the internal portions, especially the portions that are in contact with the carrier film are dried more slowly, making it difficult to dry the green tape uniformly when its thickness is increased. It is therefore recommended that the green tape should be primarily dried in an atmosphere having a humidity of 65 to 80% and a temperature of 30° to 45° C.

FIG. 1 is a diagram illustrating the mechanism of an apparatus which is suited for putting the above-mentioned drying method into practice, in which reference numeral 1 denotes a primary drying chamber where the drying is effected under humid atmospheric conditions, and 2 denotes a secondary drying chamber which effects the drying using hot air as is widely done. The humid hot air to be supplied to the primary drying chamber is produced by a humid air generating chamber 3, supplied by a blower 4 to the drying chamber 1, and is recovered from the other end through a duct 5. The hot air to be supplied to the secondary drying chamber is produced by a hot air generating chamber 7, supplied by a blower 8 to the drying chamber 2, recovered from the other end of the drying chamber 2, and is introduced to the hot air generating chamber 7 through duct 9.

The primary drying chamber 1 and the second drying chamber 2 are connected with each other beneath a separator wall 10, such that the green tape being dried is allowed to move from the primary side to the secondary side. A polyester sheet 11 moves through the drying chambers to carry the green tape. The polyester sheet 11 is supplied from a supply side 11' and is taken up at the take-up side 11", being actuated by an endless belt 14 which is driven by pulley 13 that is rotated by a motor 12.

Figure 2:
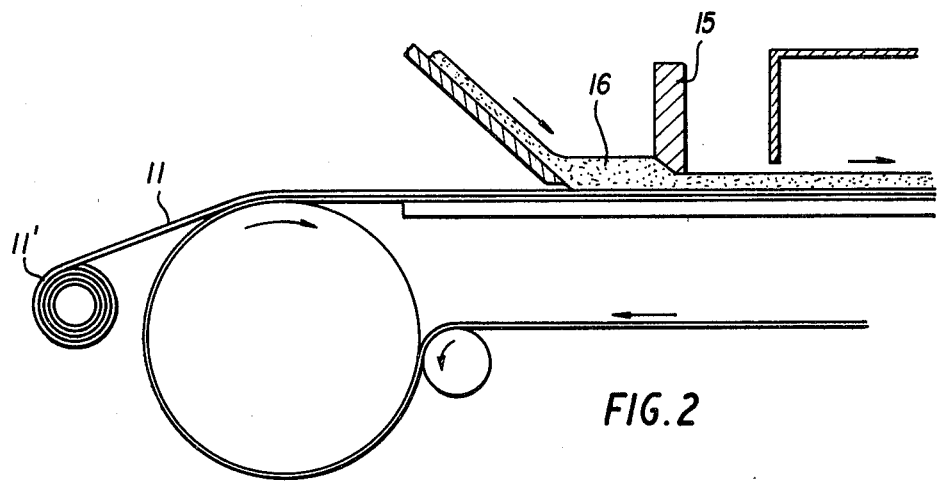
FIG. 2 is a diagram illustrating on an enlarged scale, the portion of the apparatus of FIG. 1 designated by the reference letter A.

As illustrated on an enlarged scale in FIG. 2, the aqueous slip 16 is supplied to the polyester sheet 11 in front of the inlet port of the primary drying chamber 1, spread into a tape of a predetermined thickness by the doctor knife 15, subjected to the primary drying by the humid hot air in the primary drying chamber 1, while it is being conveyed by the polyester sheet 1, moved into the secondary drying chamber 2 passing beneath the separator wall 10 and is dried by hot air in the customary manner. A green tape 17 which is uniformly dried internally is then wound up after it has come out of the secondary drying chamber.

Figure 3:
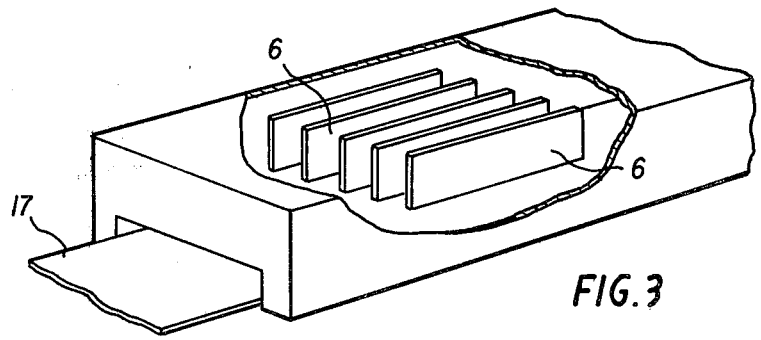
FIG. 3 is a perspective view illustrating, in partial section, the interior of a drying chamber of the apparatus of FIG. 1.

Referring to FIG. 1 again, baffles 6 are installed as illustrated in the partial section view of FIG. 3. The humid hot air or dry hot air introduced by the blowers 4 and 8 is directed by the baffles in the drying chambers, so that the green tape 17 passing through the lower portion of the drying chambers is uniformly dried.

Having generally described the invention, a more complete understanding can be obtained by reference to certain specific examples, which are provided herein for purposes of illustration only and are not intended to be limiting unless otherwise specified.

In the following examples, a water-compatible polyurethane resin suitable for use in this invention is described and working examples of the invention and comparative examples are described. The compositions and the results of the testing are summarized in Table 1. In Table 1, Examples 1 to 4 are those prepared according to the process of this invention, Examples 5–10 are comparative examples prepared using water-compatible resins other than those of this invention, and Example 11 is a comparative example prepared using a conventional organic solvent. In Table 1, parts and percentages (%) are all by weight unless otherwise specified.

Examples 1–11:

A solution of a urethane prepolymer was obtained by reacting 47 parts of a polyoxytetramethylene glycol having an average molecular weight of 2000, 23.5 parts of a polyoxyethylene glycol having an average molecular weight of 2000, and 15.4 parts of tolylene diisocyanate at 70° C. for 3 hours using 37 parts of methyl ethyl ketone as a solvent. The urethane prepolymer solution was then reacted with an excess of diethylene triamine to form a polyurethane urea polyamine, followed by reaction with an epichlorohydrin in an amount of 10% with respect to the amount of the diethylene triamine. The reaction product was then admixed with 7.5 parts of an aqueous solution containing 70% of glycolic acid and 400 parts of de-ionized water. Thereafter, the methyl ethyl ketone was distilled off under reduced pressure to adjust the concentration and obtain a stable dispersion of a water-compatible polyurethane having a low viscosity and a resin content of 20.0%.

Slips were then prepared and green ceramic tapes prepared therefrom by the following general procedure. The ingredients of the slip were introduced into a ball mill made of alumina, and were milled for about 16 hours using alumina balls in an amount about double that of the total ingredients to obtain a slip. Air bubbles in the slip were removed by a vacuum defoaming apparatus, and the viscosity of the slip was measured. A layer of slip was then cast on a substrate in the form of a tape and the cast slip then introduced into the drying apparatus shown in FIG. 1 to dry it and prepare a green ceramic tape.

Examples 1 to 4 were prepared by the method of the present invention. Examples 1 to 3 employed alumina powder of a purity of 96% having an average particle diameter of 2 μm as the ceramic powder; Example No. 4 employed alumina powder of a purity of 99.5% having an average particle diameter of 0.6 μm as the ceramic powder. The dispersion of a water-compatible polyurethane binder (resin content of 20%) prepared above was used as a binder for each of Examples 1 to 4 in an amount of 35 parts per 100 parts of the alumina powder, and polyoxyethylene nonylphenol ether (HLB value of 17.5) was added in an amount of 1 part as a dispersing agent. Then, de-ionized water was added in amounts as shown in Table 1.

Examples 5–10 are comparative examples employing polyvinyl alcohol, polyvinyl acetate emulsion, and polyacrylates which are generally used water-soluble organic binders. The ceramic powder used for Examples 5 to 10 was the same as that used for Examples 1 to 3. As the dispersing agent, Examples 5 to 9 employed the same polyoxyethylene nonylphenol ether (HLB value 17.5) as that of Examples 1 to 4, in amounts as shown in Table 1. Example 10 employed a dispersing agent known as Primal 850 (brand name) in the amount shown in Table 1. The above ingredients were blended with glycerin or dibutyl phthalate and more further admixed with de-ionized water in amounts as shown in Table 1. The ingredients were formed into slips and then into green tapes through the same steps and under the same conditions as those of specimens Nos. 1 to 4.

Example 11 is a comparative example, wherein the same ceramic powder as that of Examples 1 to 3 was blended with polyvinyl butyral resin binder employing a conventionally used organic solvent consisting of cyclohexanone, ethanol and toluene, and further blended with a plasticizer consisting of dibutyl phthalate. The specimen was then formed into a slip in the same manner as the above-mentioned examples, and was dried in the customary manner to obtain a green tape. The green tape exhibited a density of about 2.07. When sintered at 1570° C., the green tape exhibited an apparent specific gravity of 3.75 and a surface coarseness of about 0.45 μRa.

The properties of Examples 1 to 10, which do not use binders that employ organic solvent, were compared with the properties of the conventional Example 11 which uses organic solvent. Examples Nos. 5 to 10 exhibit extremely poor slip fluidity, low density of the green tape, poor flexibility and elasticity, poor toughness, and poor surface coarseness of the sintered products. Especially, the green tape of Example 9 was so brittle that it was difficult to measure its density and the like.

Examples 1 to 4 obtained by the method of the present invention, on the other hand, exhibited good fluidity and maintained a homogeneously dispersed state when they were formed into aqueous slips. The slips also exhibited good viscosity, and the resulting green tapes had good flexibility, elasticity, and toughness, and could be easily handled. The green tapes further exhibited smooth surfaces and excellent density. When the green tapes were sintered in the open air at 1570° C., the apparent specific gravity and the surface coarseness were somewhat superior to those of Example 11 as shown in Table 1.

Thus, it may be seen that the method of the present invention makes it possible to obtain very excellent products without using organic solvent. Also, the method of the present invention does not produce offensive odors and does not cause health hazards. Further, since water alone is used to prepare the aqueous binder, the danger of explosion is eliminated.

Furthermore, according to the method of the present invention, the slip or the like which has adhered to the machinery, equipment or walls can be easily washed away with water, which is an advantage with regard to environmental sanitation and handling as compared with the oily slips that must be washed away with organic solvents.

Having now fully described the invention, it will be apparent to one skilled in the art that many changes and modifications can be made thereto without departing from the spirit or scope of the invention as set forth herein.

TABLE 1

| Specimen No. | 1 | 2 | 3 | 4 | 5 | 6 | 7 | 8 | 9 | 10 | 11 |
|---|---|---|---|---|---|---|---|---|---|---|---|
| Alumina | 96% alumina 100 parts | 96% alumina 100 parts | 96% alumina 100 parts | 99.5% alumina 100 parts | 96% alumina 100 parts | 96% alumina 100 parts | 96% alumina 100 parts | 96% alumina 100 parts | 96% alumina 100 parts | 96% alumina 100 parts | 96% alumina 100 parts |
| Binder | Aqueous polyurethane of Example 1 | Aqueous polyurethane of Example 1 | Aqueous polyurethane of Example 1 | Aqueous polyurethane of Example 1 | PVA | PVA | PVA | Polyvinyl acetate (resin content 41.5%) | Polyvinyl acetate (resin content 41.5%) | Polyacrylic acid ammonium salt (resin content 40%) | Polyvinyl butyral |
| Plasticizer | 35 parts | 35 parts | 35 parts | 35 parts | 10 parts Glycerin 5.3 parts | 5 parts Glycerin 1 part | 1 part Glycerin 1 part | 12 parts Glycerin 1 part | 2.4 parts Glycerin 1 part | 20 parts Glycerin 5.6 parts Dibutyl phthalate 1.0 part | 8 parts Dibutyl phthalate 3 parts |
| Dispersing agent | Polyoxyethylene nonylphenol ether (HLB 17.5) 1 part | Polyoxyethylene nonylphenol ether (HLB 17.5) 1 part | Polyoxyethylene nonylphenol ether (HLB 17.5) 1 part | Polyoxyethylene nonylphenol ether (HLB 17.5) 1 part | Polyoxyethylene nonylphenol ether (HLB 17.5) 0.5 part | Polyoxyethylene nonylphenol ether (HLB 17.5) 0.1 part | Polyoxyethylene nonylphenol ether (HLB 17.5) 0.1 part | Polyoxyethylene nonylphenol ether (HLB 17.5) 0.1 part | Polyoxyethylene nonylphenol ether (HLB 17.5) 0.1 part | Primal 850 0.4 part | 0 part |
| Solvent | De-ionized water 1.3 part | De-ionized water 2.7 parts | De-ionized water 6.0 parts | De-ionized water 2.7 parts | De-ionized water 49 parts | De-ionized water 45 parts | De-ionized water 37 parts | De-ionized water 30 parts | De-ionized water 37 parts | De-ionized water 35 parts | Cyclohexanone 26 parts, Ethanol 10 parts, Toluene 14 parts |
| Density of green tape (g/cm³) | 2.15 | 2.29 | 2.32 | 2.44 | 1.92 | 1.80 | 1.90 | 1.60 | — | 2.05 | 2.07 |
| Surface coarseness Ra (μm) | 0.40 | 0.39 | 0.38 | 0.15 | 0.54 | 0.58 | 0.59 | 0.67 | — | 0.51 | 0.45 |
| Apparent specific gravity | 3.74 | 3.76 | 3.75 | 3.91 | 3.75 | 3.73 | 3.75 | 3.75 | — | 3.68 | 3.75 |
| Slip viscosity 23 ± 1° C. 10 r.p.m. | 12400 | 4600 | 640 | 8400 | 30000 | 40000 | 40000 | 22800 | 24000 | 20000 | 14000 |
| 20 r.p.m. | 8800 | 3600 | 480 | 5400 | 20000 | 24400 | 26400 | 13000 | 16800 | 12800 | 12000 |
| 50 r.p.m. | 6000 | 2900 | 320 | 3200 | 13000 | 13300 | 15500 | 6400 | 10300 | 7900 | 10000 |
| B-type viscometer 100 r.p.m. | 4700 | 2500 | 240 | 2200 | 10000 | 8800 | 10800 | 3800 | 7200 | 6000 | 8900 |
| Particle size of alumina | 2μm | 2μm | 2μm | 0.6μm | 2μm | 2μm | 2μm | 2μm | 2μm | 2μm | 2μm |
| Drying | Primary drying; Hot air of humidity 65% and temperature 40° C. Secondary drying; Hot air of temperature 100° C. | | | | | | | | | | Hot air temperature: Primary 30° C./ Secondary 70° C., Tertiary 110° C. |
| Evaluation | Green tape having increased density smoothness and strength. | Green tape having increased density smoothness and strength. | Green tape having increased density smoothness and strength. | Green tape having increased density smoothness and strength. | Green tape having poor density and smoothness. | Green tape having poor density, smoothness, fluidity and no strength. | Green tape having poor density, smoothness, fluidity and no strength. | Green tape having poor density and no strength. | Green tape having poor density and smoothness. | Green tape having poor density and smoothness. | Green tape having increased density, smoothness and strength. |

What is claimed as new and desired to be secured by Letters Patent of the United States is:

1. A green ceramic tape, comprising:
   a fine ceramic powder and a water-compatible polyurethane binder in a solvent selected from the group consisting of water and mixtures of water with water soluble organic solvents, said binder being present in a proportion of 2 to 15 parts by weight per 100 parts by weight of said ceramic powder.

2. The ceramic green tape of claim 1, wherein said binder is present in the proportion of about 7 parts by weight per 100 parts by weight of said ceramic powder.

3. The green ceramic tape of claim 1, wherein said water soluble organic solvent is ethyl alcohol or ethylene glycol.

4. A slip for preparing a green ceramic tape, said slip comprising 100 parts by weight of a finely divided ceramic powder, 2 to 15 parts by weight of a water-compatible polyurethane resin binder, an amount of a dispersing agent effective for dispersing said ceramic powder, and an amount of water sufficient to provide the composition with a viscosity suitable for forming a green ceramic tape.

5. The slip of claim 4, wherein said water-compatible polyurethane resin binder is present in an amount of about 7 parts by weight.

6. The slip of claim 4, wherein said dispersing agent is non-ionic.

7. The slip of claim 4, wherein said dispersing agent has an ionic charge of the same polarity as that of said water-compatible polyurethane resin binder.

8. The slip of claim 4, wherein said dispersing agent is present in an amount of about 1 part by weight.

9. A method of producing a slip for forming a green ceramic tape comprising milling a mixture comprising 100 parts by weight of a finely divided ceramic powder, 2 to 15 parts by weight of a water-compatible polyurethane resin binder, an amount of a dispersing agent effective for dispersing said ceramic powder, and an amount of water sufficient to provide the mixture with a viscosity suitable for forming a green ceramic tape.

10. The method of claim 9, wherein said water-compatible polyurethane resin binder is present in an amount of about 7 parts by weight.

11. The method of claim 9, wherein said dispersing agent is a non-ionic dispersing agent.

12. The method of claim 9, wherein said dispersing agent has an ionic charge which is the same as that of said water-compatible polyurethane resin binder.

13. The method of claim 9, wherein said dispersing agent is present in an amount of 1 part by weight.

14. The method of claim 9, wherein said milling is conducted in a ball mill.

15. A process for producing a green ceramic tape comprising
   (1) preparing a slip by thoroughly mixing 100 parts by weight of a finely divided ceramic powder, 2 to 15 parts by weight of a water-compatible polyurethane resin binder, an amount of dispersing agent effective for dispersing said ceramic powder, and an amount of water sufficient to provide the slip with a viscosity suitable for forming a tape,
   (2) casting the slip so prepared into a tape, and
   (3) drying the tape from step (2) to prepare a green ceramic tape.

16. The process of claim 15, wherein said dispersing agent is a non-ionic dispersing agent.

17. The process of claim 15, wherein said dispersing agent has an ionic charge of the same polarity as that of said water-compatible polyurethane resin binder.

18. The process of claim 15, wherein said dispersing agent is present in an amount of about 1 part by weight.

19. The process of claim 15, wherein said slip is prepared by milling a mixture comprising 100 parts by weight of a finely divided ceramic powder, 2 to 15 parts by weight of a water-compatible polyurethane resin binder, an amount of dispersing agent effective for dispersing said ceramic powder, and an amount of water sufficient to provide said mixture with a viscosity suitable for forming a tape.

20. The process of claim 19, wherein said milling is conducted in a ball mill.

21. The process of claim 15, wherein said drying is conducted in two stages, wherein in the first stage the drying is conducted in an atmosphere having a relative humidity of 65 to 80% and a temperature of 30° to 45° C.

22. The process of claim 21, wherein the first stage of said drying is conducted in a first chamber having an atmosphere having a relative humidity of 65 to 85% and a temperature of 30° to 45° C. and said second chamber has an atmosphere having a relative humidity lower than that of said first chamber.

* * * * *